(12) United States Patent
Dickinson et al.

(10) Patent No.: US 7,013,589 B2
(45) Date of Patent: Mar. 21, 2006

(54) PARCEL SHIPPING METHODS

(75) Inventors: Kent H. Dickinson, 6228 Water's Edge Dr., Covington, GA (US) 30014; Michael R. Henson, Littleton, CO (US)

(73) Assignee: Kent H. Dickinson, Covington, GA (US)

( * ) Notice: Subject to any disclaimer, the term of this patent is extended or adjusted under 35 U.S.C. 154(b) by 141 days.

(21) Appl. No.: 10/298,145

(22) Filed: Nov. 15, 2002

(65) Prior Publication Data

US 2003/0141976 A1 Jul. 31, 2003

Related U.S. Application Data

(63) Continuation-in-part of application No. 09/956,478, filed on Sep. 18, 2001, now Pat. No. 6,737,974, and a continuation-in-part of application No. 10/170,013, filed on Jun. 10, 2002.

(51) Int. Cl.
 *G09F 3/10* (2006.01)
 *B32B 31/00* (2006.01)

(52) U.S. Cl. .......................... 40/312; 40/638; 156/247

(58) Field of Classification Search ................. 40/312, 40/313, 630, 594; 156/247, 249, 226, 227
See application file for complete search history.

(56) References Cited

U.S. PATENT DOCUMENTS

| | | | |
|---|---|---|---|
| 4,044,867 A | 8/1977 | Fisher | |
| 4,107,861 A | 8/1978 | Johnson | |
| 4,465,188 A | 8/1984 | Soroka et al. | |
| 4,479,838 A * | 10/1984 | Dunsirn et al. ............. | 156/247 |
| 4,494,592 A | 1/1985 | Bonner | |
| 4,569,082 A | 2/1986 | Ainsworth et al. | |
| 4,858,755 A | 8/1989 | Kuivanen | |
| 5,059,033 A | 10/1991 | Branson | |
| 5,217,131 A | 6/1993 | Andrews | |
| 5,323,922 A | 6/1994 | Lapoint, Jr. et al. | |
| 5,417,790 A | 5/1995 | Petrou | |
| 5,547,075 A | 8/1996 | Hoogerwoord | |
| 5,628,858 A | 5/1997 | Petrou | |
| 5,844,485 A | 12/1998 | Ryan, Jr. | |
| 5,845,806 A | 12/1998 | Parchman | |
| 5,957,583 A | 9/1999 | DeClements, Jr. et al. | |
| 6,139,188 A | 10/2000 | Marzano | |
| 6,176,613 B1 | 1/2001 | Chen | |
| 6,204,764 B1 | 3/2001 | Maloney | |
| 6,224,258 B1 | 5/2001 | Dodson | |
| 6,281,795 B1 | 8/2001 | Smith et al. | |
| 6,334,537 B1 | 1/2002 | Tepper | |

* cited by examiner

*Primary Examiner*—Cassandra Davis
(74) *Attorney, Agent, or Firm*—Timothy J. Martin; Michael R. Henson; John W. Carpenter

(57) ABSTRACT

A reusable labeling construction, and container incorporating the same to permit parcel shipment comprises a removable label and a label panel. The removable label includes strip material for receiving information corresponding to an address of an intended recipient and an adhesive layer. The label panel is adapted to be supported by the container body and includes a transparent surface portion formed of a material to which the adhesive will adhere sufficiently to retain the label on the transparent surface portion during shipment, yet from which it may be removed without tearing the strip material. A methodology of shipping parcels is also provided which contemplates preparation of a shipping package having such a reusable labeling construction.

2 Claims, 4 Drawing Sheets

PARCEL SHIPPING METHODS

RELATED APPLICATIONS

The present application is a continuation-in-part of my application Ser. No. 09/956,478 filed on Sep. 18, 2001 and entitled Shipping Container and System Along With Shipping Method Employing The Same, now U.S. Pat. No. 6,737,974. The present application is also a continuation-in-part of my co-pending application Ser. No. 10/170,013 filed on Jun. 10, 2002 and entitled Shipping Container Along With Shipping Method Employing The Same.

FIELD OF THE INVENTION

The present invention is broadly directed to container constructions, both flexible and generally inflexible, for use in the parcel shipping industry. More particularly, the present invention concerns labeling constructions for containers, as well as containers and methodologies incorporating the same, that may be used for repeatedly shipping parcels between senders and recipients in a parcel carrier industry. Through the reusability of containers having such labeling constructions, the present invention provides logistical and cost-saving advantages over existing shipping techniques. Also a concern of the present invention is the provision of flexible container constructions for alleviating the occurrence of static discharge during the shipment and storage of electronic parts and components.

BACKGROUND OF THE INVENTION

A fundamental need of commerce-based societies is the transportation of goods from one location to another. The development of various postal systems, first on the national and then on an international basis, established an organized system wherein a carrier for a price would convey a parcel from a sender to a recipient. The service provided by such carriers resulted in increasing demand and expansion of their served customer base. In addition to the governmentally sponsored postal services, private carriers have been organized to transport a wide variety of parcels for paying customers. Such companies include those known as United Parcel Service, Federal Express, DHL, Airborne and Emory, to name a few. The proliferation of such companies demonstrates the increasing need for their services.

In addition to the ordinary demands on the parcel carrier industry, the expansion of Internet commerce already has placed, and is expected to continue to place, increasing demands on the need to ship small parcels from a merchant to a customer. The role of the parcel carrier is becoming increasingly integral to the success or failure of consumer's on-line experience and business in general. Shippers know the importance of having a dependable carrier who ultimately provides dependable service to the end-use customer.

Conventional techniques for shipping parcels between senders and recipients can be inconvenient and result in packing waste. For example, when a parcel is shipped in a container, such as a flexible pouch, a cardboard box or the like, the sender typically creates a label for the container, which includes the recipient's address as well as a return address for the sender. It is quite common, for example, for an individual sender to create a shipping package by packaging the parcel into a container and affixing to the container a sticky label having the appropriate origin and destination address either printed or handwritten thereon. The shipping package may then be taken to a governmentally sponsored postal service where it is weighed and applied with appropriate postage before being shipped to the destination location corresponding to the recipient's address. In similar fashion, a sender may take the parcel to a private carrier where it is packaged and labeled, with the private carrier taking responsibility for shipment.

Another manner of shipping parcels between senders and recipients which is widely used is through the use of containers and labeling constructions which are provided by carriers, such as Federal Express, to their customer base. Here, the sender prepares the shipping package by placing the parcel in a container provided by the private carrier, and creates an appropriate shipping label on a form provided by the private carrier. In the Federal Express system, for example, the shipping label itself is a multi-sheet construction including an original form and a plurality of duplicate forms releasably attached thereto via perforation. Here, the multi-sheet shipping label is filled out to include the appropriate shipping information, as well as desired handling instructions for the carrier. Oftentimes, these forms additionally have areas for including the sender's account number so that charges are billed to an appropriate account, as well as appropriate tracking information utilized by the private carrier. The sender maintains a "sender's copy" of the label before it is either picked up by the carrier or deposited at an appropriate drop-off location, such as a drop-box maintained by the private carrier. In any event, when the shipping package is ultimately ready for shipment, the sender maintains a copy of the shipping label and a duplicate version of the shipping label is sealed within a shipping sleeve that is adhered to the container, whether it be a box, a pouch or the like. There are a variety of other techniques for creating shipping packages which are utilized by individuals, as well as private and governmentally sponsored carriers, so that the above is only a snapshot of the various techniques employed in today's commerce.

A drawback of these illustrative techniques, as well as others employed today, is that the labeling constructions themselves and the containers for the parcels are generally not reusable. Accordingly, there is much packing waste which is attendant with conventional shipping techniques, which inherently contributes to landfill waste and results in added costs and inconveniences to carriers and customers alike. Accordingly, there remains an increasing need to develop improved techniques to facilitate the preparation of shipping packages through the use of reusable containers and reusable labeling constructions, while at the same time alleviating or reducing these drawbacks. The present invention is particularly directed to fulfilling these needs.

Other drawbacks occur during the shipping and storage of electronic parts and components where it is desirable to protect the electronic components from damage during handling. It is important for individuals working with electronics to be properly grounded when the components are being handled, whether during shipment or storage of the components. One approach for properly grounding users is through the use of a wrist grounding system worn by the user while the components are being manipulated. Another approach is to restrict handling of the components in rooms set up to eliminate the possibility of electronic discharge. Unfortunately, when service and repair people are in the filed, it can be impracticable, inconvenient or time consuming to employ adequate grounding techniques such as these.

Accordingly, there also remains a need to provide a container construction which is suitable for those exposed to electronic components during shipping or storage thereof who don't have the benefit of working in a static-free environment, and particularly a flexible container construction which provides both adequate protection for the components, while also allowing for safe discharge of any static buildup. The present invention is further directed to meeting these needs.

SUMMARY OF THE INVENTION

It is an object of the present invention to provide a new and useful label panel for use with a container that is adapted to receive a parcel for shipment to an intended recipient.

Another object of the present invention is to provide a new and useful reusable labeling construction for use with shipping containers.

A further object of the present invention is to provide a new and useful container adapted to receive a parcel for shipment to an intended recipient.

It is also an object of the present invention to provide such label panels, labeling constructions and containers which can be used repeatedly to ship parcels between senders and recipients in a parcel carrier system.

It is still a further object of the present invention to provide reusable label panels, labeling constructions and containers which reduce costs and facilitate the manner by which parcels may be shipped between senders and recipients.

Yet another object of the present invention is to provide a new and useful method for shipping parcel(s) from shippers to intended recipients by facilitating the creation of shipping packages.

It is still a further object of the present invention to provide parcel carrier services with an alternative approach to facilitating the means by which their customer base sends and receives packages, while at the same time providing business advantages to parcel carrier services which lease or sell shipping containers to their customer base.

It is still another object of the present invention to provide a new and useful container construction for use during the handling of electronic parts or components, and particularly such a container construction which adequately protects the electronics while also allowing for safe discharge of any static buildup.

It is yet another object of the present invention to provide such a container construction for use with the labeling constructions and methodologies referred to above.

In accordance with these objects, the present invention is in one sense related to a reusable labeling construction for use with a container that is adapted to receive a parcel for shipment to an intended recipient. The reusable labeling construction broadly comprises a removable label and a label panel. The removable label includes a strip constructed of a selected strip material and has an area adapted to receive information corresponding to an address of the intended recipient. The removable label also is provided with a layer of selected adhesive. The label panel is adapted to be supported by a body of the container and includes a return address area for receiving information corresponding to a return address for the container, as well as a transparent surface portion overlaying at least the return address area. The transparent surface portion is preferably formed of a material to which the selected adhesive will adhere sufficiently to retain the label on the transparent surface portion during shipment, yet from which the label may be removed without tearing the strip material. The labeling panel, itself, may be formed by a label substrate and a transparent layer secured to the label substrate to create the transparent surface portion. Preferably, the label substrate is a stiff, rectangular placard, which may be laminated, having the return address indicia pre-printed thereon at an appropriate location, such as centrally on the placard. Alternatively, the return address indicia may be either reverse printed on the placard's laminate or reverse printed on a surface of the transparent layer facing the label substrate. The transparent layer is preferably a layer of film adhered to the placard whereby the return address indicia may be viewed therethrough. The transparent layer has an exposed surface portion of a release material, such as a silicone-like release material, to permit a conventional shipping label to be retained thereon during shipment yet removed without tearing or leaving a residue.

The label substrate can be constructed of any suitable material (such as clear vinyl or Lexan®) and may also include a tracking information area adapted to receive tracking information provided by a carrier responsible for delivering the parcel to the intended recipient, pre-paid postage information or postage charging information, and/or inventory tracking information associated with the container. In one embodiment, the transparent layer is also rectangular in configuration and has a reduced surface area relative to the label substrate so that it overlays only the return address indicia that is displayed on the label substrate. In another embodiment, the transparent layer is larger such that it overlays more indicia, such as the send-to address area, the return-address area, the tracking information area, the pre-paid posting information or postage charging information area, etc.

The present invention also relates to a container adapted to receive a parcel for shipment, with the container broadly comprising a closable container body having an interior and a mouth communicating with the interior. The container body includes an outer surface portion provided with the return address indicia and a transparent layer overlaying the return address indicia as discussed above. Alternatively, the container may comprise a closable container body, a label substrate provided with the return address indicia which is supported by the container body, and a transparent layer overlaying the return address indicia. It is contemplated that such a container will be owned by a parcel carrier surface, such as UPS, Mail Boxes, Etc., FedEx, so that it can be leased to customers for continual reuse.

The container preferably includes a closure movable between an open position such that the parcel may be inserted into and removed from the interior, and a closed position to retain the parcel in the interior as a received parcel. The container body is preferably formed as a flexible pouch having a perimeter, with the pouch including first and second body panels joined about a majority of the perimeter to define a sealed edge, with an unjoined portion defining the mouth of the container. The label substrate is preferably a stiff, rectangular placard sewn to one of the first and second body panels, with the transparent layer being a clear film adhered to the label substrate. The placard, its associated laminate, or the transparent layer may be provided with appropriate printed indicia, as discussed above.

An alternative container construction is in the form of a flexible pouch for use during the handling of electronic parts or components in order to provided cushioned protection for the electronics, while also allowing for safe discharge of any static buildup. In this container construction, the panels of the flexible pouch are preferably made of conductive fabric interweaved throughout with conductive, stainless steel fibers/threads. A conductive lining may also be inserted into the pouch to create a modular container construction, with this lining including an outer conductive shell to provide both abrasion and shock resistance, and in inner conductive foam lining to provide a cushioned environment for the electronic parts/components.

A method is also provided for shipping a parcel from a shipper located at an origin location to an intended recipient located at a destination location. According to this method, various operations take place at the origin location in any appropriate order. These steps include creation of a shipping package by packaging the parcel to be shipped in an individual reusable container constructed in any of the manners discussed above. A removable label is then placed on the transparent layer associated with the container, with this removable layer including a strip constructed of a selected strip material and having a first surface region adapted to receive information corresponding to an address for the intended recipient of the parcel. The removable label also includes an opposed second surface region provided with a layer of selected adhesive so that the opposed second surface region of the label can be secured to the exposed surface portion of the transparent layer during shipment to the intended recipient, yet removed therefrom at the destination location without tearing the strip of material. The address of the intended recipient is then placed on the first surface region of the selected strip material. Thereafter, the shipping package is delivered to the destination location.

Another embodiment of this methodology contemplates the repeated shipping of parcels from shippers each located at a respective origin location to intended recipients each located at a respective destination location. This methodology is similar to the methodology discussed above with respect to a single shipper/single recipient but contemplates that the various steps associated with that methodology are repeated at each respective origin location.

Finally, a label panel is also provided for use with a container adapted to receive a parcel for shipment to an intended recipient. The label panel broadly comprises a label substrate securable to a body of the container, with this label substrate including return address indicia corresponding to a return address for the container and a transparent film, as discussed above, which is adhered to the label substrate and overlays at least the return address indicia.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

According to the present invention, then, a reusable labeling construction is provided for use with a container that is adapted to receive a parcel for shipment to an intended recipient. Various container constructions and a methodology are also provided, each of which may incorporate the various reusable labeling constructions of the invention. In this regard, the present invention provides an improvement over the container (having associated labeling construction) which is described in my co-pending application Ser. No. 09/956,478, the disclosure of which is incorporated herein by reference.

Figure 1:
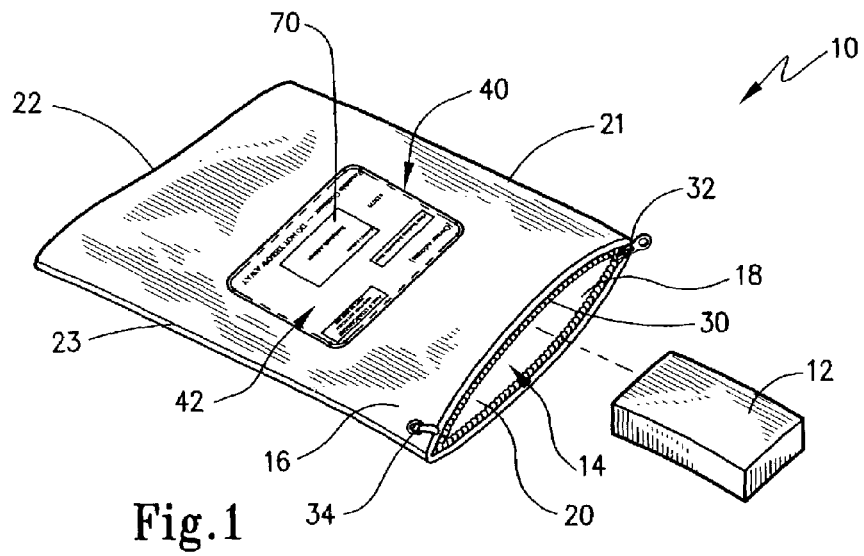
FIG. 1 is a perspective view showing a representative parcel being inserted into a first exemplary embodiment of a container of the present invention, which is in the form of a flexible pouch.

With reference first to FIG. 1, a container 10 is shown which is in the form of a flexible pouch that is adapted to receive a parcel 12 in the interior 14 thereof. Container 10 is shown to have a front pouch panel 16 and a back pouch panel 18 which are rectangular in shape and are joined about three edges, 21, 22 and 23 located at the perimeter thereof. Panels 16 and 18 are opened along a portion of the perimeter to define a mouth 20 through which parcel 12 may be inserted into interior 14 to define a received parcel. A zipper 30 includes a pull-tab 32 and is shown in an open position so that mouth 20 is open. The present invention contemplates that container 10 can take on a variety of forms, but is preferably constructed as described in my co-pending application Ser. No. 09/956,478.

Front panel 16 of container 10 supports a reusable labeling construction 40 having a label panel 42 adapted to be supported by front panel 16 and affixed thereto in any convenient manner, such as adhesive, sealing, etc. Disposed on label panel 42 is a conventional address label 70 containing information corresponding, for example, to an address of the intended recipient of parcel 12 as well as the address for the sender. Once parcel 12 has been received into the interior 14 of container 10, the container may be placed in a closed state by manipulating zipper 30 to close mouth 20. Thus, zipper 30 provides a closure for container 10 that is moveable between an open position such that the parcel 12 may be inserted and removed from the interior 14 of container 10, and a closed position so as to retain the parcel 12 in the interior 14 as a received parcel. If desired also, a locking structure may be inserted through grommets 34 (only 1 shown) that are located proximately to the corners of front and back panel 16, 18 and through pull-tab 32 to retain the closure (such a zipper 30) in the closed position. A preferred locking structure is also discussed in my copending application Ser. No. 09/956,478 in reference to FIG. 2 thereof.

The reusable labeling construction of the present invention, as well as any appropriate container which utilizes the same, such as container 10 in FIG. 1, reduces inconvenience by facilitating the preparation of shipping packages by a sender, while at the same time adding convenience and reducing cost for parcel carriers. These advantages will become apparent as the invention is described in the context of its anticipated use. However, the ordinarily skilled artisan should readily appreciate that the context in which the invention may be used is for illustrative purposes only and that the present invention should not be restricted to this particular manner of use. With that in mind, reference is now made to FIGS. 2–4 to discuss one exemplary embodiment for the labeling construction 40 according to the present invention. As discussed above, labeling construction 40 comprises a label panel 42 adapted to be supported by a body of the container, such as front panel 16, and a removable label 70. As shown, label panel 42 preferably includes a label substrate 43 that may be affixed to front body panel 16 by stitching 44 such that it travels with the container at all times. As represented in FIG. 4, panel 16 may be a multi-layered construction having fabric layers 34 and 36 sewn together about their margins with a cushioning layer 35 sandwiched or interposed therebetween. Accordingly, it may be seen in FIG. 4 that label substrate 43 is secured most directly to upper fabric layer 34 by the stitching 44. Label substrate 43 may be in the form of a stiff, rectangular placard made of any suitable material such as vinyl or Lexan® (available from General Electric Company Corporation of Pittsfield, Mass.),so that it is not subject to deformity or damage during repeated use of the container. In addition to label substrate 43, label panel 42 preferably includes a transparent layer 50 that is disposed on and overlays a portion of label substrate 43.

Figure 3:
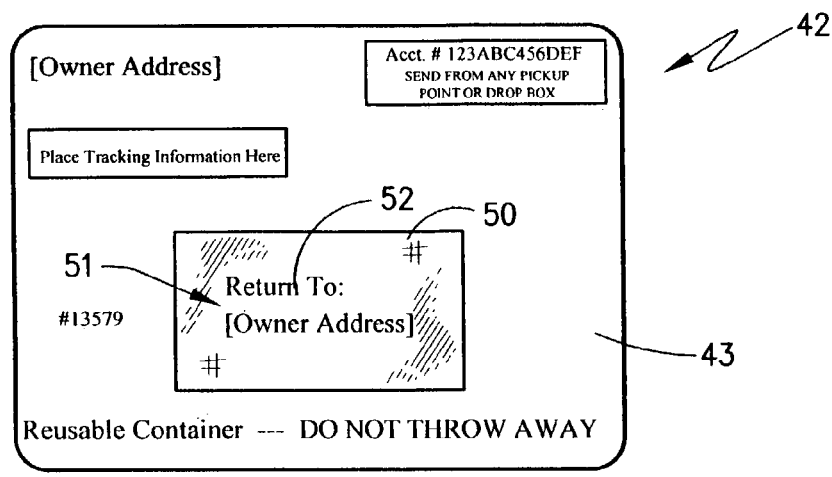
FIG. 3 is an enlarged top plan view of a first exemplary embodiment of the label panel according to the present invention, which is used with the container of FIG. 1.
Figure 4:
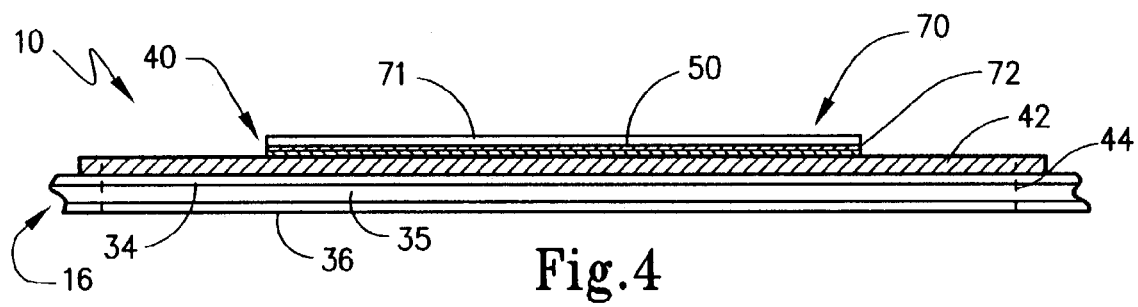
FIG. 4 is an enlarged cross-sectional view of the labeling construction as viewed about line 4—4 in FIG. 2.

The construction for label substrate 43 is best appreciated with reference particularly to FIG. 3. It is contemplated that a container that is provided with a label panel such as that shown in the figures will be owned by a parcel carrier, referred to throughout this description as the "owner" of the container, and leased for a price to a customer so that it may be reused many times. Accordingly, should the container get misplaced during transit or for other reason need to be returned to the parcel carrier owner, label substrate 42 allows for this to be done in a very convenient manner. To this end, it may be seen in FIG. 3 that the label panel 42 is provided with return address indicia 52 corresponding to the return address for the owner of the container (i.e. the parcel carrier in this example). This return address indicia may be printed on the rectangular placard 43 with the transparent film layer 50 overlaying it so that the return address indicia 52 may be seen therethrough as shown in FIG. 3. Alternatively, the return address indicia (or any other desired indicia for that matter) can be reverse printed on either the placard's laminate or a surface of the transparent layer 50 which faces the label substrate.

Figure 2:
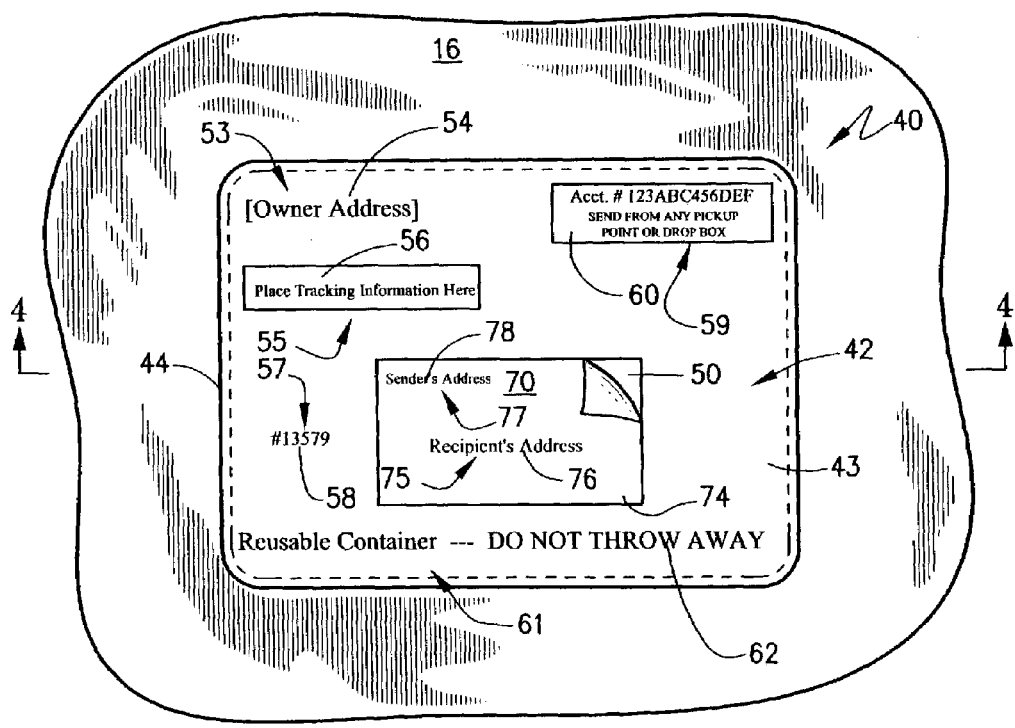
FIG. 2 is an enlarged top plan view showing a first exemplary embodiment of the reusable labeling construction of the present invention attached to the top panel associated of the pouch in FIG. 1.

Also preprinted on the label substrate 43 is another area 53 in the upper left corner which is also provided with the owner's address information 54 so that this address is visibly discernable at all times during transit. As shown in the figures, there are other types of information that may be printed or otherwise applied to placard 43 to facilitate shipping of the parcel. These may include, for example, a tracking information area 55 where appropriate tracking information 56 may be applied. This tracking information 56 may be in a variety of forms, such as a bar code, an alphanumeric designation, or the like. Also provided, preferably in the upper right hand corner is another region 59 for receiving postage information 60. As shown in FIGS. 2 and 3, the postage information 60 may be in the form of an account number utilized by the sender and/or recipient which is printed on the label substrate 43. Of course, as with the tracking information, the postage information can be in the form of an alphanumeric designation as shown or be present in a bar code format. Alternatively, of course, the upper right corner of label substrate 43 can simply be left blank but have sufficient room for application of postage stamps or the like. As also shown in the Figures, another region 57 may be provided for receiving inventory tracking information 58 associated with the particular container for which the reusable label construction 40 is used, as well as yet another region 61 containing preprinted information 62 to alert users that the container itself is reusable in the hope of preventing inadvertent disposal thereof.

Of course, the ordinarily skilled person should readily appreciate that the various types of information illustrated in the figures associated with the reusable labeling construction is for illustrative purposes only to explain the preferred embodiment of the present invention and should not in any way unduly limit or otherwise restrict the scope of the invention. For example, it may be that the sender, rather than leasing a container from a parcel carrier actually owns the container and its reusable label construction so that indicia 52 and 54 in FIGS. 2 and 3 would correspond to the sender's address since the sender and owner in such case would be one and the same.

With continued reference particularly to FIGS. 3 and 4, transparent layer 50 which overlays the owner's return address indicia 52 is preferably formed as a film of a transparent plastic material whereby the owner's address indicia may be seen therethrough. Layer 50 is surfaced with a coating or layer of release material such as polytetrafluoroethylene or other suitable material. To this end, layer 50 can be the ER4-C Economy Clear available from the Kennedy Group of Willoughby, Ohio. Upon preparation of the shipping package, the sender prepares a removable label, such as label 70, which is formed as a strip of selected strip material 71. Disposed on strip 71 is a layer 72 of suitable adhesive material that is adapted to adhere to the exposed surface portion of transparent layer 50. Label 70 can be a standard address label typically used on paperboard cartons and the like. With reference again to FIG. 2, label 70 includes an area 75 adapted to receive information 76 corresponding to the address of the intended recipient of the parcel. Another area 77 is provided to receive information 78 corresponding to an address for the sender of the parcel.

Label 70 is adapted to be secured to transparent layer 50 in a manner so that adhesive layer 72 will adhere sufficiently to transparent layer 50 during shipment, yet from which the label 70 may be forcefully removed without normally tearing strip 71 during removal. This allows label 70 to remain on container 10 throughout shipment, yet permits label 70 to be removed from transparent layer 50 so that the container 10 and its associated labeling construction can be reused numerable times.

Figure 5:
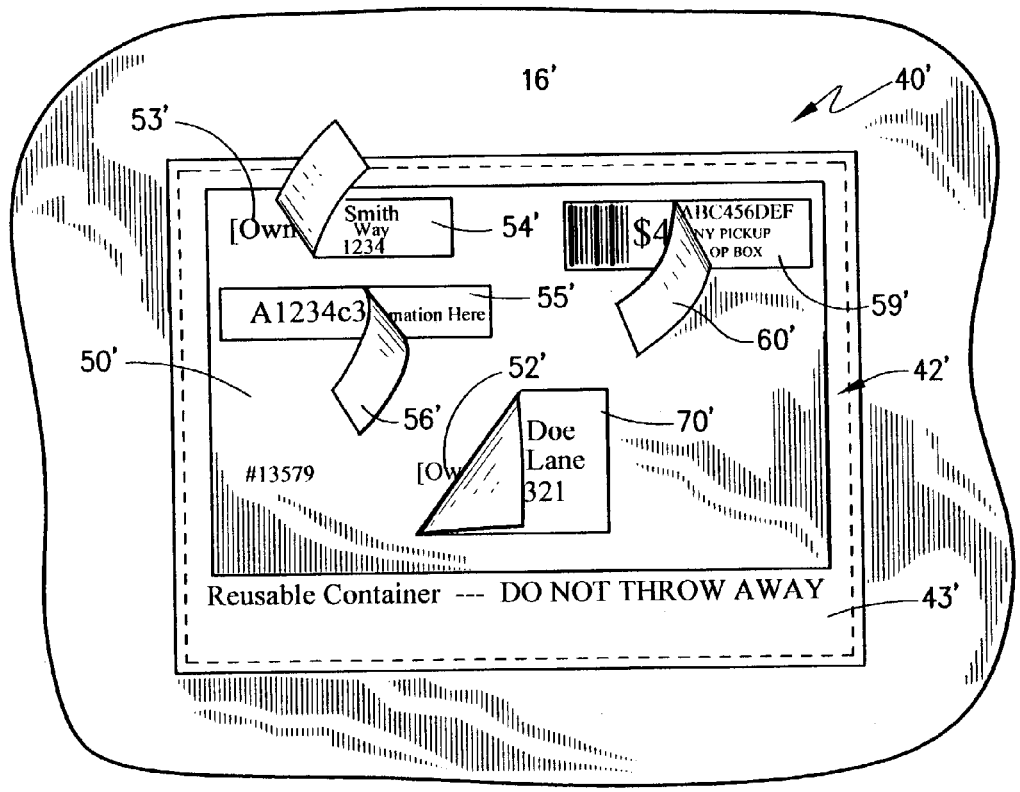
FIG. 5 is an enlarged top plan view of a second exemplary embodiment of a reusable labeling construction of the present invention.

As discussed above, the labeling construction of the present invention can take on a variety of different forms. One such alternative construction is shown in FIG. 5. Here, labeling construction 40' is constructed similarly as that discussed above, such that it includes a label panel 42' adapted to be supported by a body of the container, such as a front panel 16', and a removable label 70'. Also as discussed above, label panel 42' preferably includes both a label substrate 43' and a transparent layer 50'. In this embodiment of the labeling construction 40', however, it may be seen that transparent layer 50' overlays a majority of the surface area of the label substrate 43'. Accordingly, transparent layer 50' overlays more of the preprinted indicia that is either printed directly on the label substrate 43' or reverse printed on the underside of it's laminated surface, as discussed above. In this manner, it may be seen that a plurality of sticky labels can be applied at appropriate locations on the exposed surface of transparent layer 50' so that they can be removed without tearing or leaving residue. For instance, a removable label 70' containing indicia corresponding to the recipient's address can be placed over the pre-printed owner's address information 52'. A return address sticker 54' can be placed over preprinted area 53'. In addition, a postage pre-paid sticker 60' can be placed in the upper right hand corner over the pre-printed postage account information 59', and a tracking sticker 56' can be placed over the tracking information area 55'. Labeling construction 40', thus, has added versatility so that these various sticky labels, as desired, can be removably applied thereto to permit a container to be shipped repeatedly between senders and recipients while at the same time having the preprinted indicia discussed above so that it can be conveniently returned to the owner when necessary.

Figure 6:
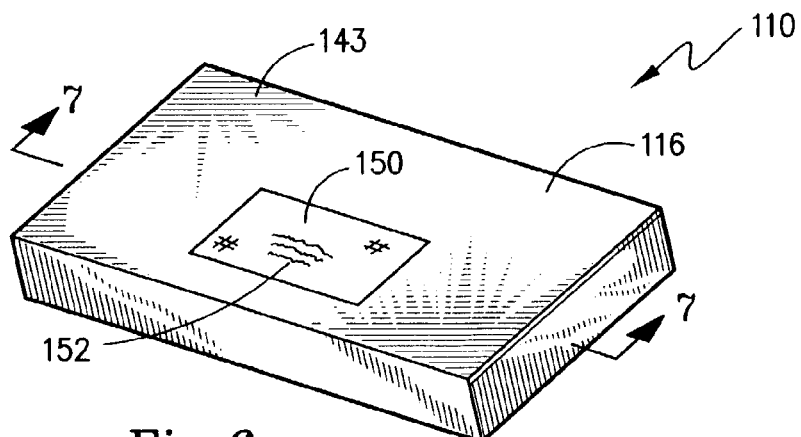
FIG. 6 is a perspective view showing a representative parcel being inserted into a second embodiment of a container of the present invention, which is in the form of a cardboard box.
Figure 7:
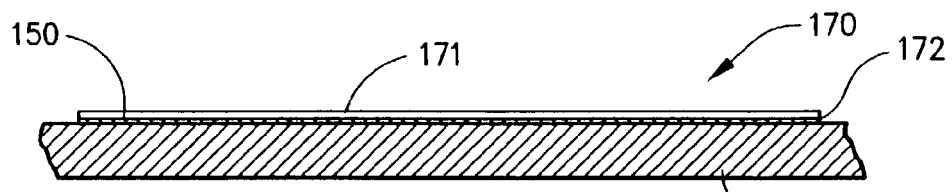
FIG. 7 is an enlarged cross-sectional view of the labeling construction for the container of FIG. 6, as viewed about line 7—7 therein.

A second exemplary embodiment for a container and associated labeling construction of the present invention is shown in FIGS. 6 and 7. Here, container 110 is shown as a conventional box construction formed of a suitable material such as cardboard or the like, so that it is constructed to be more stiff and rigid as compared to the flexible pouch container above. In this embodiment, one of the container's box panels, such as upper panel 116, actually forms the label substrate 143 upon which the appropriate indicia 152 corresponding to the address of the owner/sender may be preprinted or otherwise provided. Overlaying this indicia 152 is the transparent layer 150 as discussed above. In this manner, and as shown in FIG. 7, a removable label 170 having an associated adhesive layer 172 can be releasably applied to transparent layer 150 as discussed above. Accordingly, the container construction 110 shown in FIGS. 5 and 6 effectively eliminates the need for a separate rectangular placard since one of the panels 116 of the container body 110 accomplishes this purpose.

Figure 8:
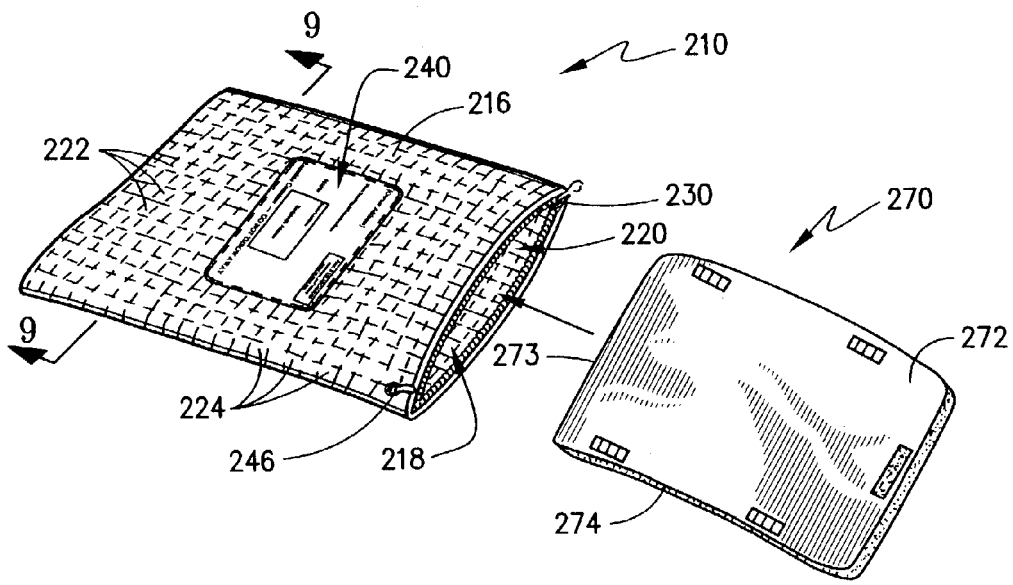
FIG. 8 is an exploded perspective view of a third exemplary embodiment of a container according to the present invention, and showing an anti-static protective insert which may be used therewith.
Figure 9:
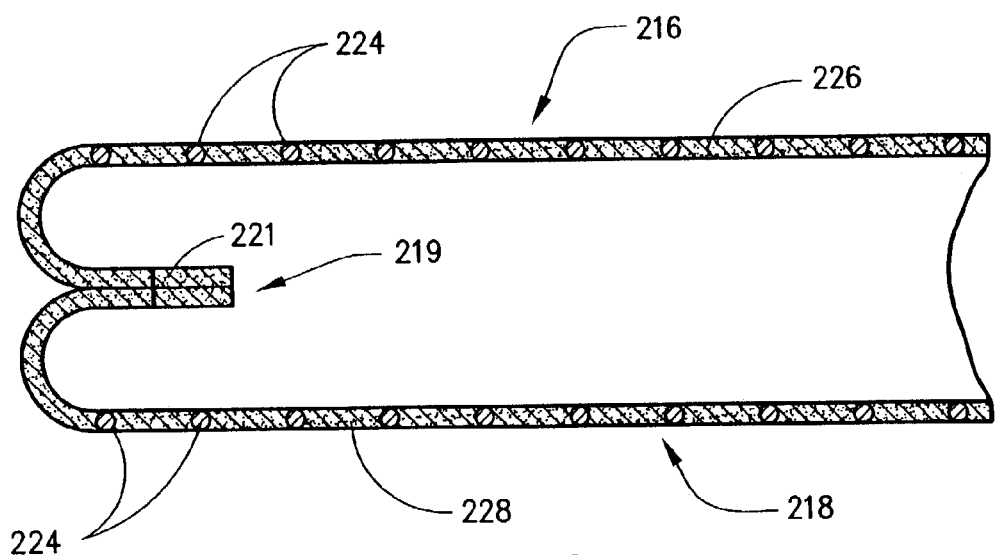
FIG. 9 is an enlarged, partial cross-sectional view of the container as viewed about line 9—9 in FIG. 8.

A third exemplary embodiment of a container construction according to the present invention is shown in FIGS. 8 and 9. Container 210, as with container 10 discussed above with reference to FIG. 1, is in the form of a flexible pouch including a front pouch panel 216 and a back pouch panel 218 which are rectangular in shape and joined about three edges, all as discussed above. As may be seen, a closure structure in the form of a zipper 230 is also provided so that the mouth 220 of the container can be opened and closed as desired. Pouch 210 also includes grommets 246 so that the mouth thereof can be locked in the closed configuration. A reusable labeling construction 240, which may be in any of the constructions discussed above, is provided on front panel 216.

The difference in container 210 from that shown in FIG. 1 is that container 210 is particularly constructed for use with shipping electronic components and parts. To this end, the panel layers 216 and 218 are constructed to discharge static electricity. As shown in FIGS. 8 and 9, each of top panel 216 and bottom panel 218 is a single layer construction sewn about their edge margins, such as left edge margin 219, via sewing 221. Each of panels 216 and 218 is formed as a conductive fabric using conductive fibers which run through the fabric. As such, to this end, each of panels 216 and 218 is formed to include a cloth layer, 226 and 228, respectively, that may be made of polyester and stainless steel fabric. Cloth layers 226 and 228 are also preferably formed of threads having fire retardant characteristics to prevent spark discharge. Suitable yarn having these characteristics is marketed under the name Bekitex®. Interweaved in the fabric layers 226 and 228 are a plurality of conductive stainless steel fibers 222 and 224, such as those marketed under the name Bekinox®. Of course, other suitable fabrics and fibers can be employed other than those particularly described herein. Together, the fibers and yarns prevent the build-up of static electricity and avoid spark discharges.

As best shown in FIG. 8, the conductive fibers are preferably arranged throughout the fabric layers as a plurality of rows 222 and columns 224, thereby to create a matrix array. Each of the rows and columns of these stainless steel fibers are preferably spaced apart about ½ inch, which should adequately limit the amount of static build-up that can form on the surface layer of the fabrics. Of course, this spacing can vary but it is understood that spacing the fibers with too much fabric between them will increase the chance of static electricity forming.

As also shown in FIG. 8, a lining 270 may also be provided which is sized and adapted for insertion into the open mouth 220 of container 210. when so used, this creates a modular container construction. Lining 270 serves a variety of useful purposes. On the one hand, it can line the inside of container 210 and provide protection for parcels. As such, liner 270 provides abrasion and shock resistance for products shipped inside container 210. Importantly also, lining 270 also has antistatic characteristics to alleviate the build-up of static electricity when electronic components are shipped. To this end, lining 270 is appropriately constructed in a manner which exhibits these capabilities.

As shown in FIGS. 8 and 10(*a*)–10(*b*), lining 270 is preferably an elongated rectangular member that is creased about a mid line 273 to form a pair of geometrically congruent panel sections 272 and 274 which are oriented in a generally spaced apart, confronting relationship to one another during shipment, as shown in FIG. 8. Preferably, lining 270 includes an outer conductive plastic shell 277 which is flexible yet somewhat rigid to provide puncture resistance, and an antistatic foam lining 279 secured thereto in any appropriate manner, such as via adhesive or the like. The conductive plastic layer 277 may be any of a line of conductive plastics available from the Inteplast Corporation of _Livingston, N.J., and marketed under the names Con-Plast or Profile Plastics. Anti-static foam lining 279 is preferably a polyethylene foam laminated to conductive layer 277 and commonly referred to as "Pink Poly". Pink Poly is currently used to protect electronic components and can be manufactured as a thin liner, a bubble wrap, or foam of differing thicknesses. This foam lining is preferably soft, cushiony, and the thickness thereof can vary depending on the cushioning desired. The intent is to employ a conductive material that will not allow a build-up of static charges. The advantage of this polyethylene foam is that it can offer some cushioning when constructed in different thicknesses. This can be very helpful in the development of the anti-static system.

If desired also, although not shown in the drawings, a final layer of protection can be employed by placing the electronic component(s) inside a Mylar® bag and then placing the components inside the anti-static lining construction 270. Alternatively, a thin film layer of Mylar® could be laminated to the polyethylene layer 279 if this foam layer 279 ultimately presents a problem with breaking down or "littering" the electronic component(s) after several uses. If a separate Mylar® bag is employed, then this makes it possible to utilize the bag many times. Another shipping option could utilize a nylon/urethane insert for the shipping container, in addition to lining 270. Such an insert is not inherently anti-static but can be treated with a liquid film, through known processes utilized by manufacturers of dryer sheets and the like. Alternatively, a strip of conductive material could be attached to interconnect the inside conductive plastic liner to the outer shell 277 of lining 270, as well as the container's fabric layers 226 and/or 228 utilizing an appropriate means, such as hook and loop fasteners.

Figures 10A, 10B:
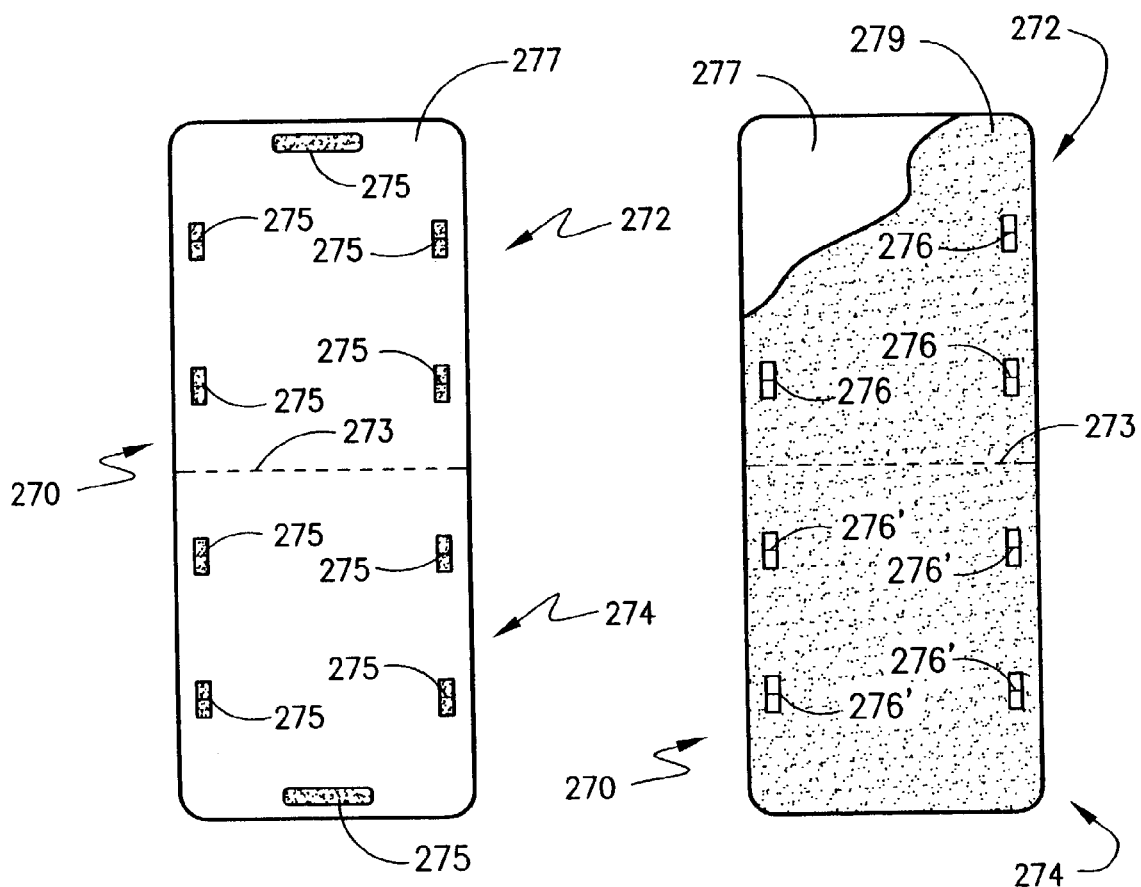
FIGS. 10(*a*) and 10(*b*), respectively, are outer and inner plan views of the container's anti-static protective insert illustrated in FIG. 8, and showing the insert in an unfolded condition

As also seen in FIGS. 8 and 10(a)–10(b), a plurality of fastening structures are provided on lining 270 so that it can be removably, yet semi-permanently, positioned within container 210. Of course, cooperative fastening structures (not shown) could be employed on the inner surfaces of the container's panels 216 and 218. To this end, fastening structures may be provided as cooperative hook fastening strips 275 (FIG. 10(a)) positioned along longitudinally and transverse edge margins of the lining's outer shell layer 277. These fastening strips 275 can be appropriately maintained on layer 277 through adhesive, sewing or other appropriate securement means. With this construction, the hook fastening strips 275 could directly engage the panel layers 216 and 218 if they are appropriately constructed of a fabric material which can cooperatively engage the hook fasteners. Alternatively, cooperative loop fastening strips could be secured to the inner surfaces of panel layers 216 and 218 at appropriate positions therealong to engage hook fastening strips 275.

As shown in FIG. 10(b), cooperative hook and loop fastening strips 276 and 276' may be secured, respectively, to the inner foam surface 279 of lining 270. As such, when lining 270 is creased about crease line 273, panel sections 272 and 274 can also be fastened together to better envelop the electronic components during shipment and prevent dislodgement.

With the above in mind relating to container and labeling constructions which are contemplated by the present invention, it should be appreciated that the present invention also contemplates a method of shipping a parcel from a shipper located at an origin location to an intended recipient located at a destination location. According to this methodology, various steps occur at the origin location, and these steps may be accomplished in any appropriate order. One of these steps relates to the creation of the shipping package by packaging the parcel to be shipped into an individual reusable container that includes an enclosable container body having an interior and a mouth communicating with interior, and a label panel. The label panel, itself, includes owner address indicia corresponding to an address for an owner of the container and an exposed transparent surface portion overlaying the owner address indicia so that the owner address indicia may be seen therethrough. The exposed surface portion formed of a release material. Another step contemplates the placement of a removable label onto the transparent surface portion. The removable label includes a strip constructed of a selected strip material and having a first surface provided with information corresponding to an address for the intended recipient for the parcel. An opposed second surface region of the removable label is provided with a layer of a selected adhesive so that the opposed second surface region of the label can be secured to the exposed surface portion during shipment to the intended recipient, yet removed there from at the destination location with out tearing the strip of material. According to the broad methodology, once the shipping package is created at the origin location, the terminal step in the methodology provides for delivery of the shipping package to the destination location.

An alternative form of this methodology contemplates the shipment of parcels between a plurality of shippers and a plurality of intended recipients. Each shipper is located at a respective origin location and each intended recipient is located at a respective destination location. According to this methodology, a respective shipping package is created at each respective origin location for a respective shipper in the manner discussed above. The respective shipping package is then delivered to the destination location associated with the intended recipient, and these steps are repeated at each respective origin location.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A method of shipping a parcel from a shipper located at a origin location to an intended recipient located at destination location, comprising:
   a. at the origin location and in any order:
      i. creating a shipping package by packaging the parcel to be shipped in an individual reusable container that includes:
         1. a closable container body having an interior and a mouth communicating with the interior;
         2. a label panel including
            a. owner address indicia corresponding to an address for an owner of the container, and
            b. an exposed transparent surface portion overlaying the owner address indicia so that the owner address indicia may be seen therethrough, said transparent surface portion formed of a release material;
      ii. placing a removable label onto the transparent surface portion, said removable label including
         1. a strip constructed of a selected strip material and having a first surface region provided with information corresponding to an address for the intended recipient of the parcel, and
         2. an opposed second surface region provided with a layer of a selected adhesive so that the opposed second surface region of said label can be secured to said exposed surface portion during shipment to the intended recipient, yet removed there from at the destination location without tearing the strip of material; and
      iii. delivering the shipping package to the destination location.

2. A method of shipping parcels from shippers each located at a respective origin location to intended recipients each located at a respective destination location, comprising:
   a. at a respective origin location for a respective shipper and in any order:
      i. creating a respective shipping package by packaging each parcel to be shipped by the respective shipper in an individual reusable container that includes:

1. a closable container body having an interior and a mouth communicating with the interior;
2. a label substrate secured to said container body, said label panel including owner address indicia corresponding to an address for an owner of the container; and
3. a transparent layer secured to said label substrate and overlaying said owner address indicia so that the owner address indicia may be seen therethrough, said transparent layer including an exposed surface portion formed of a release material;

ii. placing an associated removable label onto the transparent layer, each removable label including
1. a strip constructed of a selected strip material and having a first surface region provided with information corresponding to an address for an associated intended recipient of the parcel, and
an opposed second surface region provided with a layer of a selected adhesive so that the opposed second surface region of said label can be secured to said exposed surface portion of the transparent layer during shipment to the associated intended recipient, yet removed there from at the associated destination location without tearing the strip of material;

iii. delivering the shipping package to the destination location associated with the intended recipient; and
iv. repeating steps (a)(ii) through (a)(iii) at each respective origin location.

* * * * *

UNITED STATES PATENT AND TRADEMARK OFFICE
CERTIFICATE OF CORRECTION

| | |
|---|---|
| PATENT NO. | : 7,013,589 B2 |
| DATED | : March 21, 2006 |
| INVENTOR(S) | : Kent H. Dickinson et al. |

It is certified that error appears in the above-identified patent and that said Letters Patent is hereby corrected as shown below:

<u>Title page,</u>
Item [75], Inventors, "Kent H. Dickinson, 6228 Water's Edge Dr., Covington, GA (US) 30014; Michael R. Henson, Littleton, CO (US)" should read -- Kent H. Dickinson, 6228 Water's Edge Dr., Covington, GA (US) --.

Signed and Sealed this

Twenty-third Day of May, 2006

JON W. DUDAS
*Director of the United States Patent and Trademark Office*